US012531029B2

(12) United States Patent
Kim

(10) Patent No.: US 12,531,029 B2
(45) Date of Patent: *Jan. 20, 2026

(54) GATE DRIVING CIRCUIT AND ELECTROLUMINESCENT DISPLAY DEVICE USING THE SAME

(71) Applicant: LG DISPLAY CO., LTD., Seoul (KR)

(72) Inventor: Dong-Hyun Kim, Paju-si (KR)

(73) Assignee: LG Display Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/381,040

(22) Filed: Oct. 17, 2023

(65) Prior Publication Data

US 2024/0046884 A1 Feb. 8, 2024

Related U.S. Application Data

(63) Continuation of application No. 17/841,991, filed on Jun. 16, 2022, now Pat. No. 11,830,435, which is a continuation of application No. 17/135,941, filed on Dec. 28, 2020, now Pat. No. 11,393,403.

(30) Foreign Application Priority Data

Dec. 30, 2019 (KR) ........................ 10-2019-0177728

(51) Int. Cl.
*G09G 3/3266* (2016.01)
*G09G 3/3225* (2016.01)

(52) U.S. Cl.
CPC ......... *G09G 3/3266* (2013.01); *G09G 3/3225* (2013.01); *G09G 2300/0842* (2013.01); *G09G 2310/08* (2013.01); *G09G 2320/0233* (2013.01); *G09G 2330/021* (2013.01)

(58) Field of Classification Search
CPC ............... G09G 3/3266; G09G 3/3225; G09G 2300/0842; G09G 2310/08; G09G 2320/0233; G09G 2330/021
See application file for complete search history.

(56) References Cited

U.S. PATENT DOCUMENTS 9,224,329 B2 12/2015 Kim et al.
11,830,435 B2 * 11/2023 Kim ..................... G09G 3/3233
2016/0240603 A1 * 8/2016 Park ......................... G09G 3/20
2017/0053591 A1 * 2/2017 Seo ...................... G09G 3/3225
(Continued)

FOREIGN PATENT DOCUMENTS

KR 10-2019-0049274 A 5/2019

OTHER PUBLICATIONS

Korean Office Action dated Feb. 27, 2024 issued in Patent Application No. 10-2019-0177728 (4 pages).

*Primary Examiner* — Kenneth B Lee, Jr.
(74) *Attorney, Agent, or Firm* — Fish & Richardson P.C.

(57) ABSTRACT

A gate driving circuit includes a plurality of stages that are dependently connected, wherein an n-th one of the stages (n being a natural number) comprises a node controller for controlling voltages of set and reset nodes, a scan signal generator controlled in accordance with the voltages of the set and reset nodes, thereby outputting a scan signal to a scan line of a display panel, and a reference voltage/high-level supply power output unit controlled in accordance with the voltages of the set and reset nodes, thereby outputting a reference voltage or a high-level supply voltage to a reference voltage line of the display panel.

18 Claims, 7 Drawing Sheets

(56) References Cited

U.S. PATENT DOCUMENTS

| | | | | |
|---|---|---|---|---|
| 2017/0186373 | A1 | 6/2017 | Nishikawa et al. | |
| 2017/0199616 | A1* | 7/2017 | Kim | G06F 3/0412 |
| 2021/0043150 | A1* | 2/2021 | Lee | G09G 3/3291 |
| 2021/0201828 | A1* | 7/2021 | Jung | G09G 3/3696 |

* cited by examiner

| | Initial | Sampling | Holding | Emission |
|---|---|---|---|---|
| Vref | Vref | Vref | VDD | VDD |
| DT-G | Vini | Vdata-\|Vth\| | ← | Vdata-\|Vth\|+(VDD-Vref) |
| DT-S | - | Vdata | ← | VDD |
| DT-D | - | Vdata-\|Vth\| | ← | - |

GATE DRIVING CIRCUIT AND ELECTROLUMINESCENT DISPLAY DEVICE USING THE SAME

CROSS-REFERENCE TO RELATED APPLICATION

This application is a continuation of U.S. patent application Ser. No. 17/841,991, filed on Jun. 16, 2022, which is continuation of U.S. patent application Ser. No. 17/135,941, filed on Dec. 28, 2020, now U.S. Pat. No. 11,393,403, issued on Jul. 19, 2022, which claims the priority benefit of Korean Patent Application No. 10-2019-0177728 filed on Dec. 30, 2019, which are hereby incorporated by reference in their entirety.

BACKGROUND

Field of the Disclosure

The present disclosure relates to a display device, and more particularly to a gate driving circuit and an electroluminescent display device using the same.

Description of the Background

With the recent progress of information-dependent society and the recent development of various portable electronic appliances such as a mobile communication terminal and a notebook computer, demand for a flat panel display device applicable to the above-described electronic appliances has gradually increased.

As such a flat panel display device, a liquid crystal display (LCD) device using liquid crystals, and an organic light emitting diode (OLED) display device using OLEDs are used.

Such a flat panel display device includes a display panel having a plurality of gate lines and a plurality of data lines, and a driving circuit for driving the display panel, in order to display an image.

In the display panel of the OLED display device among such display devices, the plurality of gate lines and the plurality of data lines intersect each other to define sub-pixels, and each sub-pixel includes an OLED element, and a pixel circuit for independently driving the OLED element.

The OLED element includes an anode, a cathode, and an organic compound layer formed between the anode and the cathode. The organic compound layer includes a hole injection layer HIL, a hole transport layer HTL, an emission layer EML, an electron transport layer ETL, and an electron injection layer EIL. When a drive voltage is applied between the anode and the cathode, holes passing through the hole transport layer HTL and electrons passing through the electron transport layer ETL migrate to the emission layer EML and, as such, excitons are produced. As a result, the emission layer EML generates visible light.

The pixel circuit includes a driving thin film transistor (TFT) for controlling driving current IOLED flowing through the OLED element in accordance with a gate-source voltage Vgs, a capacitor for constantly sustaining the gate-source voltage Vgs of the driving TFT for one frame, and at least one switching TFT for setting the gate-source voltage Vgs of the driving TFT in response to a gate signal (scan pulse). Accordingly, the driving TFT adjusts current Ids driving the OLED element in accordance with a gate-source driving voltage Vgs corresponding to image data, thereby adjusting brightness of the OLED element.

When the pixel of the OLED display device exhibits non-uniform characteristics due to variations in threshold voltage Vth, mobility, etc. of the driving TFT according to process deviation, driving environment, driving time, etc., the current Ids may vary with respect to the driving voltage Vgs at the same grayscale level and, as such, a luminance non-uniformity phenomenon may occur.

In order to solve such a problem, the OLED display device mainly utilizes technologies for sensing characteristics of pixels and externally compensating for characteristic deviation, etc. of the pixels based on the sensed results.

A sensing method for extracting a variation in threshold voltage Vth of the driving TFT includes operating the driving TFT in a source follower manner, sensing a source voltage of the driving TFT, and then detecting a variation in threshold voltage of the driving TFT based on the sensed voltage. The threshold voltage variation of the driving TFT is determined in accordance with the level of the sensed voltage. Based on the determined threshold voltage variation, an offset value for data compensation is derived.

In order to regulate current capability characteristics of the driving TFT, except for the threshold voltage Vth of the driving TFT, a sensing method for extracting a variation in mobility μ of the driving TFT includes applying, to a gate of the driving TFT, a predetermined voltage Vdata+X (X being a voltage according to offset value compensation) higher than the threshold voltage of the driving TFT, thereby turning on the driving TFT, and receiving, as a sensing voltage, a source voltage Vs of the driving TFT charged for a predetermined time under the above-mentioned condition. The mobility variation of the driving TFT is determined in accordance with the level of the sensing voltage. Based on the determined mobility variation, a gain value for data compensation is derived.

A 6T1C pixel circuit (constituted by six TFTs and one capacitor) or a 7T1C pixel circuit has also been proposed to compensate for threshold voltage (Vth) and mobility (μ) deviations of the driving TFT within the pixel circuit, different from the above-mentioned external compensation methods.

In the 6T1C pixel circuit or the 7T1C pixel circuit, however, an IR drop phenomenon of a high-level supply voltage VDD (caused by a load difference) (hereinafter referred to as "VDD IR drop") may occur. In this case, luminance deviations among pixels may be generated and, as such, a mura defect may be generated.

To this end, an 8T1C pixel circuit capable of compensating for VDD IR drop while compensating for deviations of the threshold voltage Vth and mobility μ of the driving TFT within the pixel circuit has recently been proposed.

The 8T1C pixel circuit needs a reference voltage Vref in order to compensate for VDD IR drop. However, the 8T1C circuit has drawbacks in that it is impossible to supply a high-level supply voltage VDD using a mesh structure because the reference voltage Vref should be supplied, and to repair a supply line for the high-level supply voltage VDD when the supply line is opened.

SUMMARY

Accordingly, the present disclosure is directed to a gate driving circuit and an electroluminescent display device using the same that substantially obviate one or more problems due to limitations and disadvantages of the related art.

The present disclosure is also to provide a gate driving circuit configured to supply a high-level supply voltage VDD through a reference voltage supply line such that a supply line for the high-level supply voltage VDD is formed to have a mesh structure, thereby being capable of repairing the supply line for the high-level supply voltage VDD, and an electroluminescent display device using the same.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve the above and other advantages and in accordance with the purpose of the disclosure, as embodied and broadly described herein, a gate driving circuit includes a plurality of stages that are dependently connected, wherein an n-th one of the stages (n being a natural number) includes a node controller for controlling voltages of set and reset nodes, a scan signal generator controlled in accordance with the voltages of the set and reset nodes, thereby outputting a scan signal to a scan line of a display panel, and a reference voltage/high-level supply power output unit controlled in accordance with the voltages of the set and reset nodes, thereby outputting a reference voltage or a high-level supply voltage to a reference voltage line of the display panel.

The n-th stage may further include an emission control signal generator for outputting an emission control signal to an emission control line of the display panel.

The reference voltage/high-level supply voltage output unit may output the reference voltage in an initialization period and a sampling period, and may output the high-level supply voltage in an emission period.

The reference voltage/high-level supply voltage comprises a first transistor outputting the reference voltage to the reference voltage line of the display panel in accordance with the voltage of the set node, and a second transistor outputting the high-level supply voltage to the reference voltage line of the display panel in accordance with the voltage of the reset node.

In another aspect of the present disclosure, an electroluminescent display device includes a display panel at which a plurality of pixels are disposed to display an image, a timing controller for generating image data rearranged in conformity with a resolution of digital video data input from outside thereof, a data control signal and a gate control signal, a data driving circuit for converting the image data input from the timing controller into an analog data voltage based on the data control signal, and supplying the analog data voltage to data lines of the display panel, and a gate driving circuit for outputting scan signals, emission control signals, and reference voltages or high-level supply voltages to corresponding ones of scan lines, emission control lines, and reference voltage lines of the display panel, respectively.

Each of the pixels disposed on an n-th horizontal line of the display panel (n being a natural number) comprises an electroluminescent diode connected between a fourth node and a low-level supply voltage line, a driving transistor connected between a first node and a third node, the driving transistor having a gate electrode connected to a second node, a first transistor connected between the third node and the second node, the first transistor having a gate electrode connected to an n-th scan line, a second transistor connected between a corresponding one of the data lines and the first node, the second transistor having a gate electrode connected to an n-th one of the scan lines, a third transistor connected between a high-level supply voltage line and the first node, the third transistor having a gate electrode connected to an n-th one of the emission control signal lines, a fourth transistor connected between the third node and the fourth node, the fourth transistor having a gate electrode connected to a corresponding one of the emission control signal lines, a fifth transistor connected between the second node and an initialization voltage line, the fifth transistor having a gate electrode connected to an n−1-th one of the scan lines, a sixth transistor connected between the fourth node and the initialization voltage line, the sixth transistor having a gate electrode connected to the n-th scan line, a seventh transistor connected between a high-level supply voltage line and a fifth node which is a reference voltage supply line, the seventh transistor having a gate electrode connected to a corresponding one of the emission control signal lines, and a storage capacitor connected between the fifth node and the second node.

A reference voltage is supplied to the fifth node during an initialization period, whereas an initialization voltage is supplied to the gate electrode of the driving transistor during the initialization period.

A reference voltage is supplied to the fifth node, a voltage obtained by deducting an threshold voltage of the driving transistor from data voltage is applied to the gate electrode and a drain electrode of the driving transistor, and a data voltage is applied to a source electrode of the driving transistor, during a sampling period.

A high-level supply voltage is supplied to the fifth node, a voltage obtained by deducting an threshold voltage of the driving transistor from data voltage is applied to the gate electrode and a drain electrode of the driving transistor, and a data voltage is applied to a source electrode of the driving transistor, during a holding period.

A high-level supply voltage is supplied to the fifth node, a voltage of (a data voltage−an threshold voltage of the driving transistor+(high-level supply voltage−reference voltage) is applied to the gate electrode of the driving transistor, and the high-level supply voltage is applied to a drain electrode of the driving transistor, during an emission period.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the present disclosure, illustrate aspect(s) of the disclosure and along with the description serve to explain the principle of the disclosure.

In the drawings.

DETAILED DESCRIPTION

Figure 1:
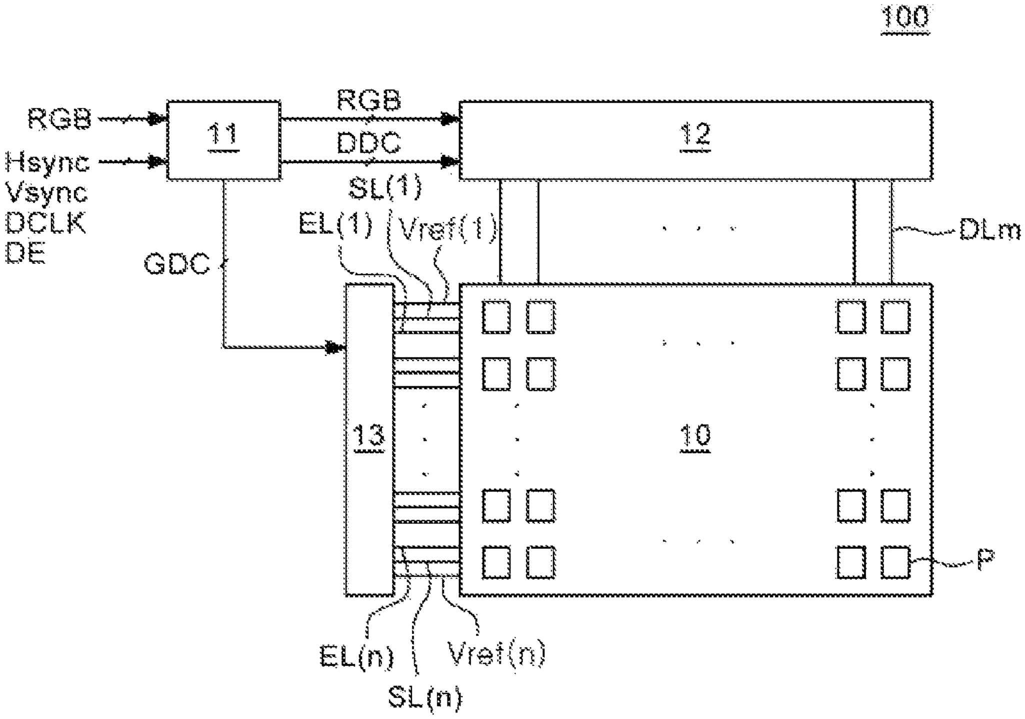
FIG. 1 is a concept diagram briefly explaining an electroluminescent display device according to an exemplary aspect of the present disclosure.

Advantages and features of the present disclosure, and implementation methods thereof will be clarified through the following aspects described with reference to the accompanying drawings. The present disclosure may be embodied in different forms and should not be construed as limited to the aspects set forth herein. Rather, these aspects are provided so that the present disclosure will be thorough and complete, and will fully convey the scope of the disclosure to those skilled in the art. Further, the present disclosure is defined only by the categories of the claims.

A shape, a size, a ratio, an angle, and a number disclosed in the drawings for describing aspects of the present disclosure are merely an example, and thus, the present disclosure is not limited to the illustrated details. The same reference numerals designate substantially the same elements throughout the specification. In the following description, when the detailed description of the relevant known function or configuration is determined to unnecessarily obscure the gist of the present disclosure, the detailed description will be omitted.

When "comprise", "have", and "include" described in the specification are used, another part may be added unless "only" is used. Terms in a singular form may include plural forms unless stated otherwise.

In construing an element, the element is construed as including a tolerance range, even if there is no explicit description.

In describing a positional relationship between two elements, for example, when the positional relationship is described using "upon", "above—", "below—", and "next to—", one or more other elements may be interposed between the two elements unless "just" or "directly" is used.

It will be understood that, although the terms "first", "second", etc. may be used herein to describe various elements, functions and structures of these elements should not be limited by these terms.

The following aspects may be partially or overall coupled or combined, and may be technically linked and implemented in various manners. The aspects may be independently implemented, or may be implemented in a co-dependent relationship.

A gate driving circuit in a display device according to the present disclosure may be embodied using a thin film transistor (TFT) having an n-type or p-type metal oxide semiconductor field effect transistor (MOSFET). Although an n-type TFT is illustrated in the following aspects, aspects of the present disclosure are not limited thereto. Such a TFT is a 3-electrode element including a gate, a source, and a drain. The source is an electrode for supplying carriers to the TFT. Within the TFT, carriers begin to flow from the source. The drain is an electrode through which carriers migrate outwards from the TFT. That is, carriers flow from the source to the drain in a MOSFET. In an n-type MOSFET (NMOS), carriers are electrons and, as such, a source voltage is lower than a drain voltage in order to enable electrons to flow from the source to the drain. Current flows from the drain to the source in the n-type MOSFET because electrons flow from the source to the drain. On the other hand, in the p-type MOSFET (PMOS), carriers are holes and, as such, a source voltage is higher than a drain voltage in order to enable holes to flow from the source to the drain. Current flows from the source to the drain in the p-type MOSFET because holes flow from the source to the drain. Here, it should be noted that the source and drain of such a MOSFET are not fixed. For example, the source and the drain in such a MOSFET may be interchanged with each other in accordance with voltages applied thereto. In the following description, accordingly, the source and the drain are referred to as a "first electrode" and a "second electrode".

A gate signal of a transistor used as a switch element swings between a gate-on voltage and a gate-off voltage. The gate-on voltage is set as a voltage turning on the transistor, and the gate-off voltage is set as a voltage turning off the transistor. In an n-channel transistor (NMOS), the gate-on voltage may be a gate-high voltage VGH, and the gate-off voltage may be a gate-low voltage VGL lower than the gate-high voltage VGH. In a p-channel transistor (PMOS), the gate-on voltage may be the gate-low voltage VGL, and the gate-off voltage may be the gate-high voltage VGH.

Hereinafter, a gate driving circuit according to each of various aspects of the present disclosure and an electroluminescent display device using the same will be described in more detail with reference to the accompanying drawings.

FIG. 1 is a concept diagram briefly explaining an electroluminescent display device according to an exemplary aspect of the present disclosure.

Hereinafter, the electroluminescent display device according to the exemplary aspect of the present disclosure will be described with reference to FIG. 1.

The electroluminescent display device 100 according to the exemplary aspect of the present disclosure includes a display panel 10 having gate lines SL1[1] to SL1[n] and Vref[1] to Vref[n], data lines DL[1] to DL[m], emission control lines EL(1) to EL(n), and a plurality of pixels P, a data driving circuit 12 for driving data lines DL[1] to DL[m], a gate driving circuit 13 for driving gate lines SL1[1] to SL1[n] and SL2[1] to SL2[n] and emission control lines EL(1) to EL(n), and a timing controller 11 for controlling driving timings of the data driving circuit 12 and the gate driving circuit 13.

The plurality of pixels P is disposed at the display panel 10 in order to display an image. The pixels P disposed on an n-th horizontal line are electrically connected to an n-th emission control line EL, an n-th scan line SL(n), an n−1-th scan line SL(n−1), and a reference voltage line Vref(n). The pixels P disposed in one row are electrically connected to one data line DL.

Transistors TFTs constituting one pixel P may be made of polycrystalline silicon (poly-Si), low-temperature polycrystalline silicon (LTPS), or the like.

Each of the plurality of pixels P disposed in a pixel area is configured to receive a high-level supply voltage VDD, a low-level supply voltage VSS and an initialization voltage Vini from a power supply (not shown). In order to avoid unnecessary light emission of electroluminescent diodes ELD in an initialization period and a sampling period, the initialization voltage Vini may be selected within a voltage range sufficiently lower than an operating voltage of the electroluminescent diodes ELD. That is, the initialization voltage Vini may be set to be equal to or lower than the low-level supply voltage VSS. In an initialization period, accordingly, a lower voltage lower than the low-level supply voltage VSS is applied as the initialization voltage Vini and, as such, the lifespan of the electroluminescent diodes ELD may increase.

In addition, the plurality of pixels P disposed in the pixel area may be configured to further receive a reference voltage Vref or a high-level supply voltage VDD from the gate driving circuit 13.

Touch sensors may be disposed on the display panel 10. Touch input may be sensed using separate touch sensors or through the pixels. The touch sensors may be of an on-cell type or an add-on type in which the touch sensors are disposed on a screen of the display panel. Alternatively, the touch sensors may be embodied using in-cell type touch sensors mounted in a pixel array.

The timing controller 11 rearranges digital video data RGB input from outside of the display device in conformity with a resolution of the display panel 10, and supplies the rearranged digital video data RGB to the data driving circuit 12. The timing controller 11 generates a data control signal DDC for controlling operation timing of the data driving circuit 12 and a gate control signal GDC for controlling operation timing of the gate driving circuit 13 based on timing signals such as a vertical synchronization signal Vsync, a horizontal synchronization signal Hsync, a dot clock signal DCLK, and a data enable signal DE.

The data driving circuit 12 converts the digital video data RGB input from the timing controller 11 into an analog data voltage based on the data control signal DDC. Although not shown, a demultiplexer DEMUX may be disposed between the data driving circuit 12 and the data lines DLm.

The gate driving circuit 13 may generate a scan signal and an emission control signal based on the gate control signal GDC, and may output a reference voltage Vref or a high-level supply voltage VDD. The gate driving circuit 13 may include a scan signal generator, an emission control signal generator, and a reference voltage/high-level supply voltage output unit. The scan signal generator applies a scan signal SCAN to scan lines SL1. The emission control signal generator applies an emission control signal EM to emission control signal lines EL. The reference voltage/high-level supply voltage output unit supplies the reference voltage Vref to a reference voltage supply line in an initial period and a sampling period of one frame period. The reference voltage/high-level supply voltage output unit also supplies the high-level supply voltage VDD to the reference voltage supply line in a holding period and an emission period of one frame period.

The gate driving circuit 13 as described above may be directly formed in a non-display area of the display panel 10 in a gate-driver in panel (GIP) manner. Of course, the above-described configurations are only illustrative, and aspects of the present disclosure are not limited thereto.

Figure 2:
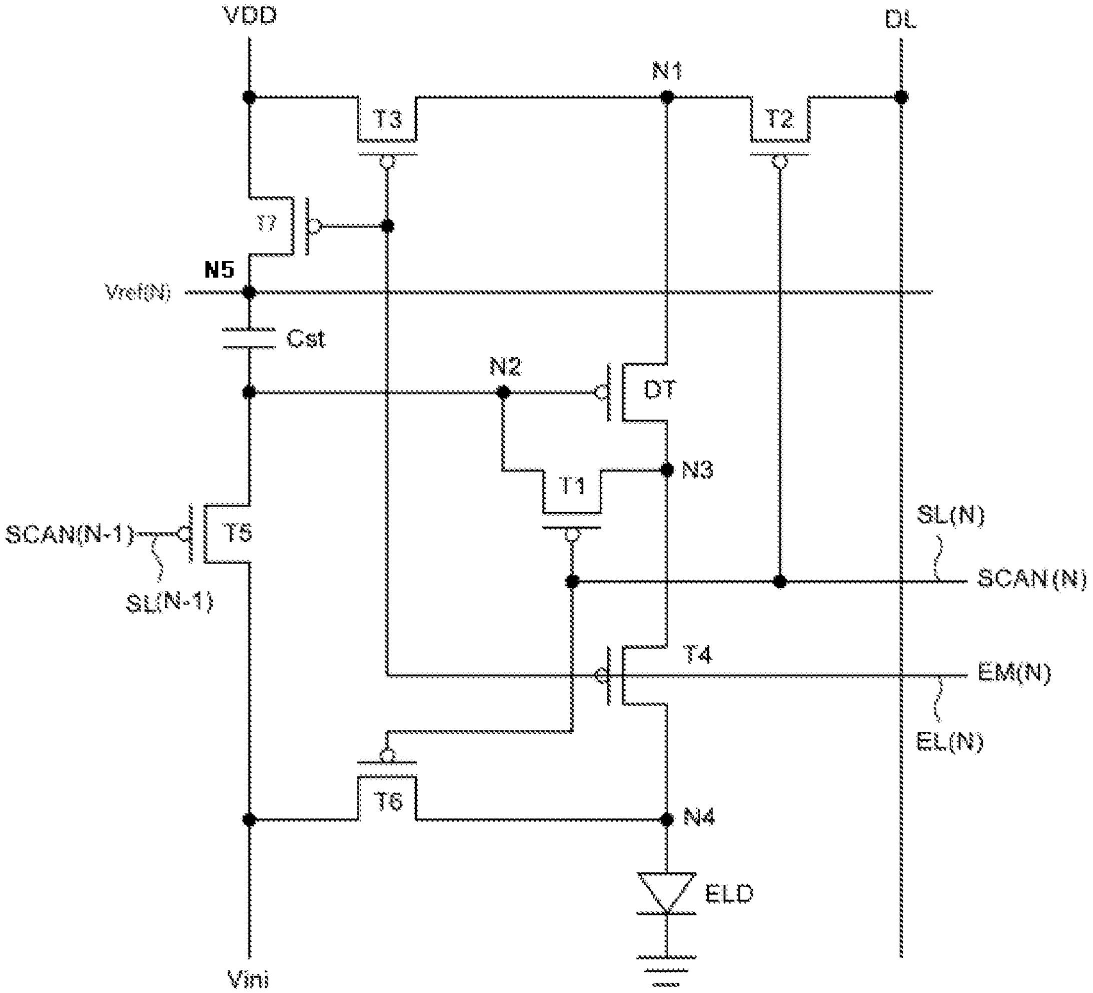
FIG. 2 is an equivalent circuit diagram briefly explaining each pixel of a display panel in FIG. 1.

FIG. 2 is an equivalent circuit diagram briefly explaining each pixel P of the display panel in FIG. 1.

Hereinafter, each pixel P of the display panel 10 in the electroluminescent display device 100 according to an exemplary aspect of the present disclosure will be described in detail with reference to FIG. 2.

Each pixel P includes an electroluminescent diode ELD, a driving transistor DT, first to seventh transistors T1 to T7, and a capacitor Cst. Of course, the above-described configuration is only illustrative, and aspects of the present disclosure are not limited thereto. Each of the first to seventh transistors T1 to T7 may be referred to as a "switching transistor ST".

The electroluminescent diode ELD emits light by driving current supplied from the driving transistor DT. Functional layers are formed between an anode and a cathode in the electroluminescent diode ELD.

The functional layers include a hole injection layer HIL, a hole transport layer HTL, an emission layer EML, an electron transport layer ETL, and an electron injection layer EIL. When a drive voltage is applied between the anode and the cathode, holes passing through the hole transport layer HTL and electrons passing through the electron transport layer ETL migrate to the emission layer EML and, as such, excitons are produced. As a result, the emission layer EML generates visible light. The electroluminescent diode ELD may also be referred to as an "organic electroluminescent diode (OLED)".

The anode of the electroluminescent diode ELD is connected to a fourth node N4. The cathode of the electroluminescent diode ELD is connected to a low-level supply voltage line supplying a low-level supply voltage VSS.

The driving transistor DT controls driving current applied to the electroluminescent diode ELD in accordance with a source-gate voltage Vsg thereof. A first electrode of the driving transistor DT is connected to a first node N1, a second electrode of the driving transistor DT is connected to a third node N3, and a gate electrode of the driving transistor DT is connected to a second node N2.

A gate electrode of the first transistor T1 is connected to an n-th scan line SL[N], a first electrode of the first transistor T1 is connected to the third node N3, and a second electrode of the first transistor T1 is connected to the second node N2. The first transistor T1 forms diode connection between the gate and second electrodes in the driving transistor DT (short circuit between the gate and second electrodes causing the transistor to operate like a diode) in response to an n-th scan signal SCAN(N).

A gate electrode of the second transistor T2 is connected to the n-th scan line SL[N], a first electrode of the second transistor T2 is connected to a data line DL, and a second electrode of the second transistor is connected to the first node N1. The second transistor T2 applies a data voltage Vdata received from the data line DL to the first node N1 in response to the n-th scan signal SCAN(N).

A gate electrode of the third transistor T3 is connected to an emission control signal line EL, a first electrode of the third transistor T3 is connected to a high-level supply voltage line VDD, and a second electrode of the third transistor is connected to the first node N1. The third transistor T3 applies the high-level supply voltage VDD to the first node N1 in response to the emission control signal EM.

A gate electrode of the fourth transistor T4 is connected to the emission control signal line EL, a first electrode of the fourth transistor T4 is connected to the third node N3, and a second electrode of the fourth transistor is connected to the fourth node N4. The fourth transistor T4 forms a current path between the third node N3 and the fourth node N4 in response to the emission control signal EM.

A gate electrode of the fifth transistor T5 is connected to an n−1-th scan line SL[N−1], a first electrode of the fifth transistor T5 is connected to the second node N2, and a second electrode of the fifth transistor is connected to an initialization voltage line Vini. The fifth transistor T5 applies an initialization voltage Vini to the second node N2 in response to an n−1-th scan signal SCAN(N−1).

A gate electrode of the sixth transistor T6 is connected to the n-th scan line SL[N], a first electrode of the sixth transistor T6 is connected to the fourth node N4, and a second electrode of the sixth transistor is connected to the initialization voltage line Vini. The sixth transistor T6 applies the initialization voltage Vini to the fourth node N4 in response to an n−1-th scan signal SCAN(N−1).

A gate electrode of the seventh transistor T7 is connected to the emission control signal line EL, a first electrode of the seventh transistor T7 is connected to the high-level supply voltage line VDD, and a second electrode of the seventh transistor is connected to a fifth node N5 which is an n-th reference voltage supply line Vref(N). The seventh transistor T7 applies the high-level supply voltage VDD to the fifth node N5 in response to the emission control signal EM.

An anode of the storage capacitor Cst is connected to the fifth node N5, and a cathode of the strotage capacitor Cst is connected to the second node N2.

The above-described configurations are only illustrative, and aspects of the present disclosure are not limited thereto.

Figure 3:
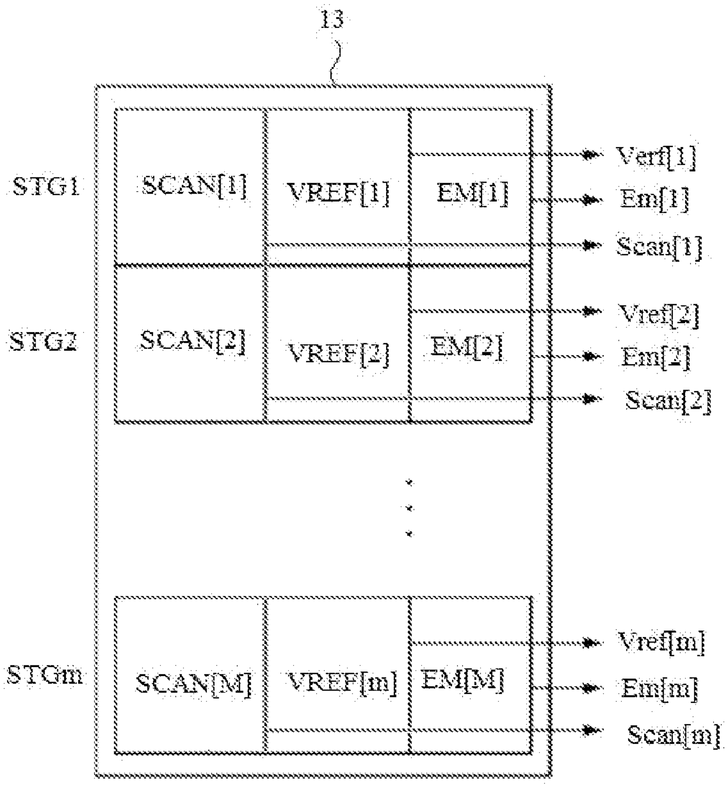
FIG. 3 is a block diagram illustrating a brief configuration of a gate driving circuit according to an exemplary aspect of the present disclosure.

FIG. 3 is a block diagram illustrating a brief configuration of the gate driving circuit 13 according to an exemplary aspect of the present disclosure.

As illustrated in FIG. 3, the gate driving circuit 13 includes a plurality of stages STG1 to STGm. The stages STG1 to STGm have a structure in which stages STG1 to STGm are connected in a dependent manner. Each of the stages STG1 to STGm receives an output signal from at least one upstream or downstream stage as an input signal thereof.

Each of the stages STG1 to STGm may include a scan signal generator SCAN[1] to SCAN[m], a reference voltage/high-level supply voltage output unit VREF[1] to VREF[m], and emission control signal generator EM[1] to EM[m].

For example, the first stage STG1 includes the first scan signal generator SCAN[1] for outputting a first scan signal Scan[1], the first reference voltage/high-level supply voltage output unit VREF[1] for outputting a reference voltage Vref[1], and the first emission control signal generator EM[1] for outputting an emission control signal Em[1].

The scan signal generators SCAN[1] to SCAN[m] output scan signals Scan[1] to Scan[m] through scan lines of the display panel, respectively. The reference voltage/high-level supply voltage output units VREF[1] to VREF[m] output reference voltages Vref[1] to Vref[m] through reference voltage lines of the display panel, respectively. The emission control signal generators EM[1] to EM[m] output emission control signals Em[1] to Em[m] through emission control signal lines of the display panel, respectively.

The emission control signals Em[1] to Em[m] may be used as signals for driving emission control transistors included in sub-pixels, respectively. For example, emission times of organic light emitting diodes may be varied through control of the emission control transistors of the sub-pixels using the emission control signals Em[1] to Em[m].

Illustration of FIG. 3 is only for best understanding of the gate driving circuit 13, and aspects of the present disclosure are not limited thereto. The gate driving circuit 13 may be implemented in the form in which more diverse and increased signals are output.

Although not shown, the scan signal generators SCAN[1] to SCAN[m] outputting respective scan signals Scan[1] to Scan[m] may be driven by a start signal GVST for scanning, a high voltage GVGH for scanning, a reset signal GRST for scanning, a low voltage GVGL for scanning, and clock signals GCLKs for scanning.

The emission control signal generators EM[1] to EM[m] outputting respective emission control signals Em[1] to Em[m] may be driven by a start signal EVST, a reset signal ERST, a high voltage EVGH, a low voltage EVGL, and clock signals ECLKs.

Figure 4:
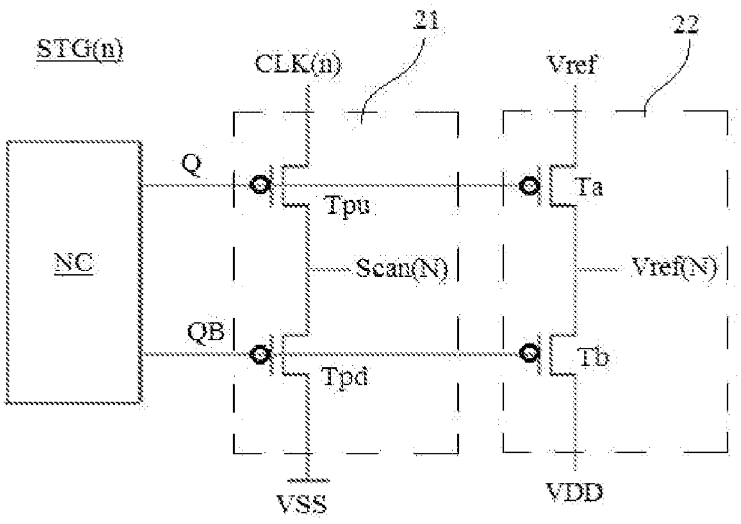
FIG. 4 is a circuit diagram briefly illustrating configurations of a scan signal generator and a reference voltage/high-level supply voltage output unit in an n-th stage according to an exemplary aspect of the present disclosure.

FIG. 4 is a circuit diagram briefly illustrating configurations of the scan signal generator SCAN[n] and the reference voltage/high-level supply voltage output unit VREF[n] in the n-th stage STGn according to an exemplary aspect of the present disclosure.

The n-th stage STGn includes a node controller NC configured to be driven by the start signal EVST, a high voltage for scanning, namely, a scan high voltage GVGH, a low voltage for scanning, namely, a scan low voltage GVGL, clock signals for scanning, namely, scan clock signals GCLKs, a scan signal Scan(n−1) output from an upstream stage, and a scan signal Scan(n+1) output from a downstream stage, thereby controlling a set node Q and a reset node QB, and a scan signal generator 21 configured by a pull-up transistor Tpu and a pull-down transistor Tpd to be controlled in accordance with voltages at the set node Q and the reset node AB, thereby outputting, as a scan signal Scan(n), a clock signal CLK(n) input thereto. The n-th stage STGn further includes a reference voltage/high-level supply voltage output unit 22 configured by eighth and ninth transistors Ta and Tb to be controlled in accordance with the voltages at the set node Q and the reset node QB, thereby supplying a reference voltage Vref or a high-level supply voltage VDD to the reference voltage line of the display panel.

Hereinafter, operation of the electroluminescent display device according to the exemplary aspect of the present disclosure configured as described above will be described.

Figures 5, 6:
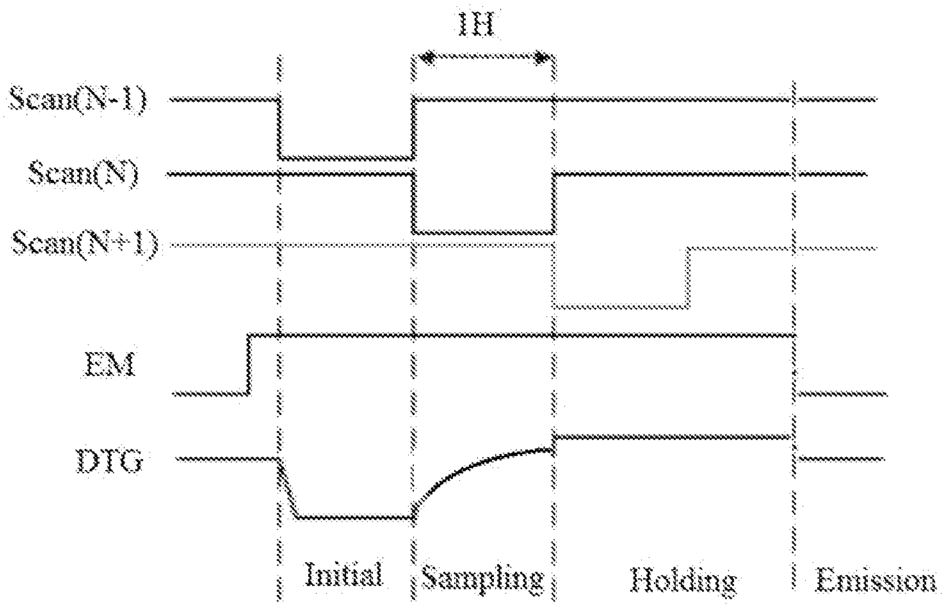
FIG. 5 shows a waveform diagram depicting scan signals and an emission control signal to drive a pixel P and a schematic waveform diagram of a gate voltage of a driving transistor in the pixel P according to the signals.
FIG. 6 is a table illustrating gate voltages, source voltages and drain voltages in the driving transistor during an initialization period, a sampling period, a holding period and an emission period according to an exemplary aspect of the present disclosure.

FIG. 5 illustrates a waveform diagram depicting the scan signals Scan(n−1), Scan(n) and Scan(n+1) and the emission control signal EM to drive the corresponding pixel P and a schematic waveform diagram of a gate voltage DTG of the driving transistor of the pixel P according to the signals.

FIG. 6 is a table illustrating gate voltages, source voltages and drain voltages in the driving transistor during an initialization period, a sampling period, a holding period and an emission period according to the exemplary aspect of the present disclosure.

Figure 7A:
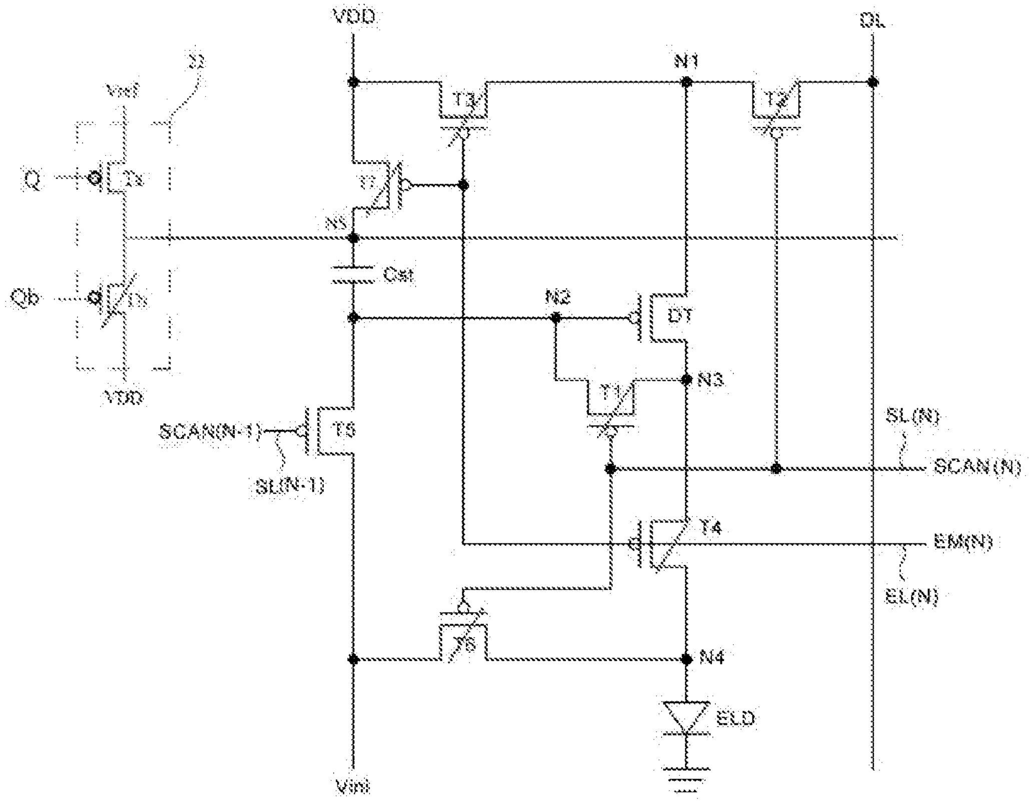
FIG. 7A is an equivalent circuit diagram of the pixel P operating during the initialization period.
Figure 7B:
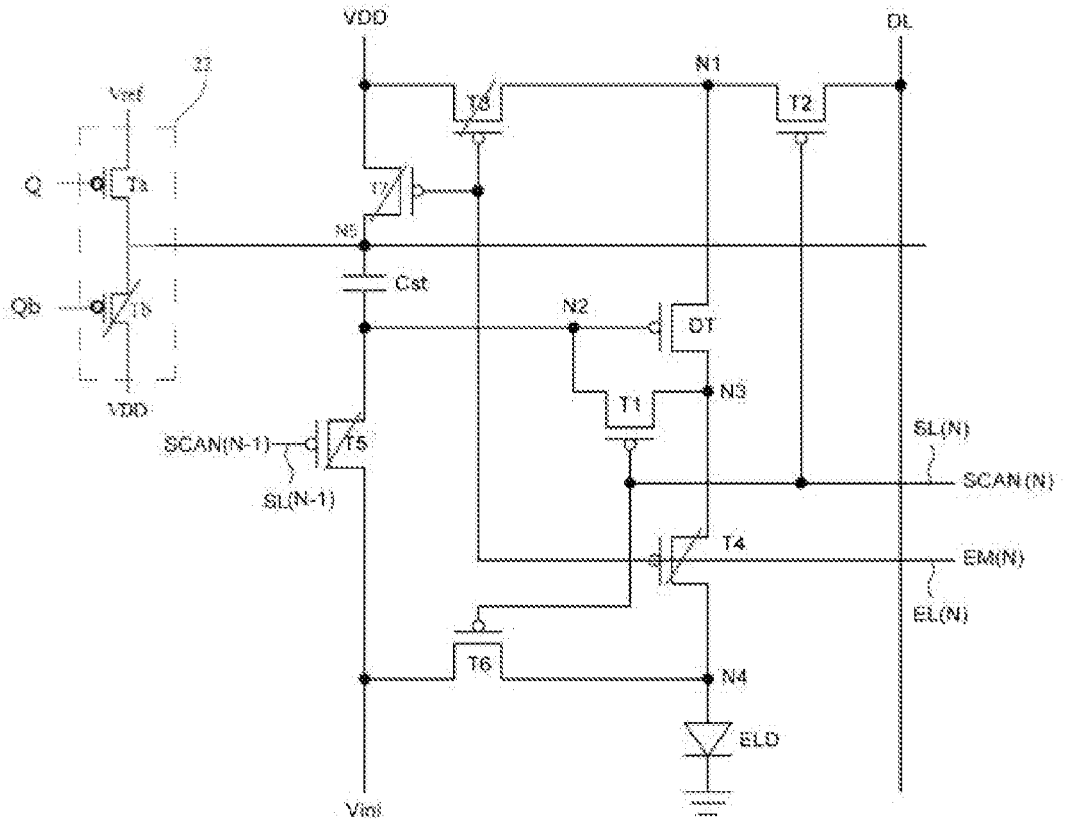
FIG. 7B is an equivalent circuit diagram of the pixel P operating during the sampling period.
Figure 7C:
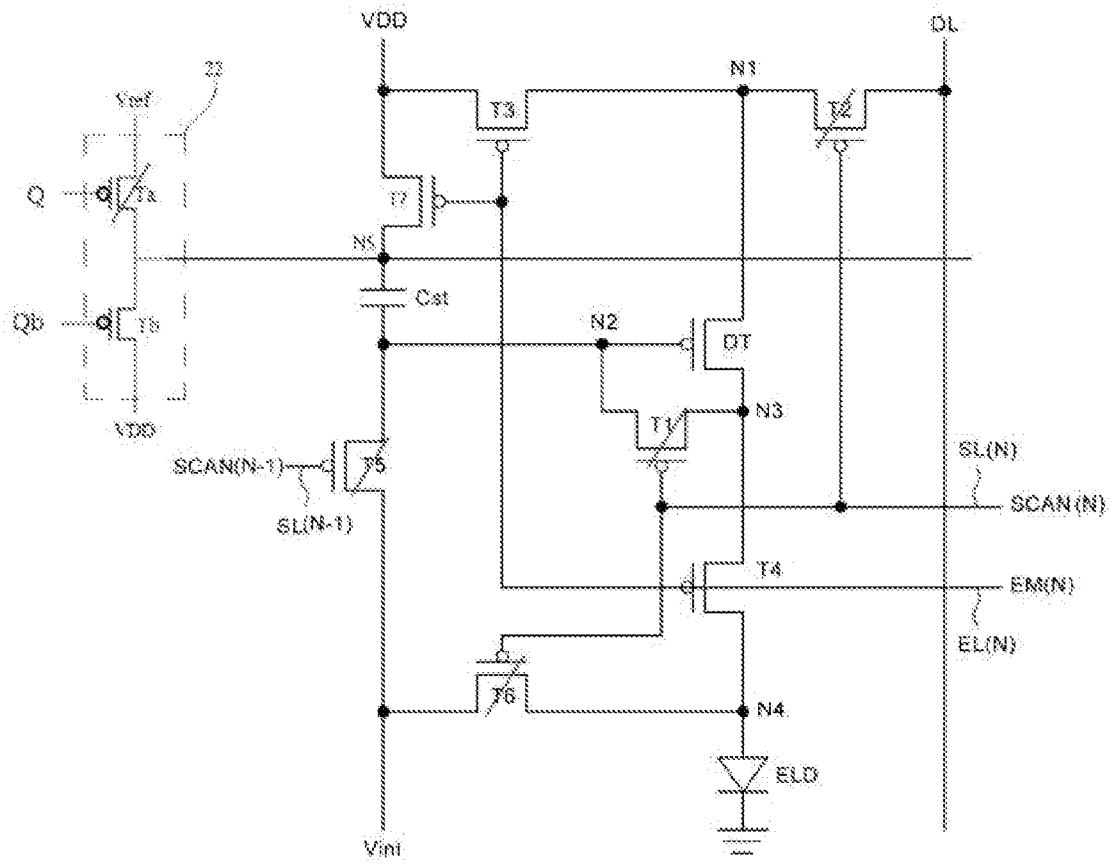
FIG. 7C is an equivalent circuit diagram of the pixel P operating during the emission period.

FIG. 7A is an equivalent circuit diagram of the pixel P operating during the initialization period. FIG. 7B is an equivalent circuit diagram of the pixel P operating during the sampling period. FIG. 7C is an equivalent circuit diagram of the pixel P operating during the emission period.

As illustrated in FIG. 5, one frame may be divided into an initialization period, a sampling period, a holding period, and an emission period, without being limited thereto.

The initialization period is a period for initializing a voltage of the gate of the driving transistor DT. The sampling period is a period for sampling a threshold voltage Vth of the driving transistor DT after initialization of the anode of the electroluminescent diode ELD, and storing the sampled threshold voltage Vth in the second node N2. The emission period is a period for programming a source-gate voltage of the driving transistor DT including the sampled threshold voltage Vth, and driving the electroluminescent diode ELD to emit light by driving current according to the programmed source-gate voltage.

The initialization period of an n-th horizontal line overlaps with the sampling period of an n−1-th horizontal line.

That is, in accordance with the exemplary aspect of the present disclosure, the sampling period may be sufficiently secured and, as such, compensation of the threshold voltage Vth may be more precisely achieved.

As illustrated in FIG. 7A, during the initialization period, the fifth transistor T5 applies the initialization voltage Vini to the second node N2 in response to the n−1-th scan signal SCAN(N−1), and the first to fourth transistors T1 to T4, the sixth transistor T6 and the seventh transistor T7 are turned off. As a result, the gate of the driving transistor DT is initialized by the initialization voltage Vini. The initialization voltage Vini may be selected within a voltage range sufficiently lower than an operating voltage of the electroluminescent diode ELD. The initialization voltage Vini may be set to be a voltage equal to or lower than the low-level supply voltage VSS. In addition, during the initialization period Initial, data voltage Vdata of a previous frame is sustained at the first node N1.

In addition, since the set node Q in the n-th stage STG(n) of the gate driving circuit 13 is in a low state, and the reset node QB in the n-th stage STG(n) of the gate driving circuit 13 is in a high state, the eighth transistor Ta of the reference voltage/high-level supply voltage output unit 22 turns on, and the ninth transistor Tb of the reference voltage/high-level supply voltage output unit 22 turns off, as illustrated in FIG. 7A. Accordingly, the reference voltage Vref is supplied to the fifth node N5 of the pixel circuit.

Thus, as shown in FIG. 6, the reference voltage Vref is supplied to the reference voltage supply line, whereas the initialization voltage Vini is supplied to the gate of the driving transistor DT.

During the sampling period, as illustrated in FIG. 7B, the sixth transistor T6 applies the initialization voltage Vini to the fourth node N4 in response to the n-th scan signal SCAN(N). As a result, the anode of the electroluminescent diode ELD is initialized by the initialization voltage Vini.

The second transistor T2 applies the data voltage Vdata received from the data line DL in response to the scan signal SCAN(N) of the n-th stage. The first transistor T1 turns on in response to the n-th scan signal SCAN(N) and, as such, the driving transistor DT establishes diode connection. The remaining transistors, that is, the third to fifth transistors T3 to T5 and the seventh transistor T7, turn off.

During the sampling period, current Ids flows between the source and the drain in the driving transistor DT. Since the gate and the drain in the driving transistor DT is in a diode connection state, the voltage of the second node N2 increases gradually by current Ids flowing from the source to the drain. During the sampling period, the voltage of the second node N2 increases to a value (Vdata(n)−|Vth|) obtained by deducting the threshold voltage Vth of the driving transistor DT from the data voltage Vdata.

Since the set node Q in the n-th stage STG(n) of the gate driving circuit 13 is in a low state, and the reset node QB in the n-th stage STG(n) of the gate driving circuit 13 is in a high state, the eighth transistor Ta of the reference voltage/high-level supply voltage output unit 22 turns on, and the ninth transistor Tb of the reference voltage/high-level supply voltage output unit 22 turns off, as illustrated in FIG. 7B. Accordingly, the reference voltage Vref is supplied to the fifth node N5 of the pixel circuit.

Thus, as shown in FIG. 6, the reference voltage Vref is supplied to the reference voltage supply line, the voltage (Vdata(n)−|Vth|) is applied to the gate and the drain in the driving transistor DT, and the voltage Vdata is applied to the source electrode of the driving transistor DT.

During the holding period, since the reset node QB in the n-th stage STG(n) of the gate driving circuit 13 is in a low state, and the set node Q in the n-th stage STG(n) of the gate driving circuit 13 is in a high state, the eighth transistor Ta of the reference voltage/high-level supply voltage output unit 22 turns off, and the ninth transistor Tb of the reference voltage/high-level supply voltage output unit 22 turns on. Accordingly, the high-level supply voltage VDD is supplied to the fifth node N5 of the pixel circuit. In addition, the first to seventh transistors T1 to T7 and the driving transistor DT in the pixel circuit turn off. Accordingly, only the voltage of the fifth node N5 is changed from the reference voltage Vref to the high-level supply voltage VDD, whereas the voltages of the gate, the source and the drain in the driving transistor DT are maintained in states in the sampling period, respectively.

During the emission period, as illustrated in FIG. 7C, the third transistor T3 applies the high-level supply voltage VDD to the first node N1 in response to the emission control signal EM(n) of the n-th stage. The fourth transistor T4 establishes a current path of the third node N3 and the fourth node N4 in response to the emission control signal EM(N) of the n-th stage. The seventh transistor T7 applies the high-level supply voltage VDD to the fifth node N5 in response to the emission control signal EM(n) of the n-th stage. As a result, driving current Ield passing through the source and the drain in the driving transistor DT is applied to the electroluminescent diode ELD. In addition, the first transistor T1, the second transistor T2, the fifth transistor T5, and the sixth transistor T6 in the pixel circuit turn off.

Since the resest node QB in the n-th stage STG(n) of the gate driving circuit 13 is in a low state, as shown in FIG. 5, the eighth transistor Ta of the reference voltage/high-level supply voltage output unit 22 turns off, and the ninth transistor Tb of the reference voltage/high-level supply voltage output unit 22 turns on. Accordingly, the high-level supply voltage VDD is supplied to the fifth node N5 of the pixel circuit.

Thus, as shown in FIG. 6, the high-level supply voltage VDD is supplied to the reference voltage supply line, the voltage (Vdata(n)−|Vth|+(VDD-Vref) is applied to the gate electrode of the driving transistor DT, and the high-level voltage VDD is applied to the drain electrode of the driving transistor DT, during the emission period.

Thus, each pixel circuit of the electroluminescent display device according to the exemplary aspect of the present disclosure receives, at the first node N1, the high-level supply voltage VDD from the voltage supply (not shown) through the third transistor T3 while receiving, at the fifth node N5, the high-level supply voltage VDD through the ninth transistor Tb of the reference voltage/high-level supply voltage output unit 22 in the gate driving circuit 13. As such, in accordance with the exemplary aspect of the present disclosure, the high-level supply voltage line may be formed to have a mesh structure.

The relation expression of driving current Ield flowing through the electroluminescent diode ELD during the emission period may be expressed by the following Expression 1:

$$Ield=K(Vsg-Vth)^2=K\{VDD-(Vdata-|Vth|+(VDD-Vref))-Vth\}^2=K(Vref-Vdata)^2 \quad \text{[Expression 1]}$$

In Expression 1, k represents a proportional constant determined by electron mobility, parasitic capacitance, channel region width (W) and channel region length (L), etc. of the driving transistor DT.

As shown in Expression 1, a threshold voltage (Vth) component of the driving transistor DT is erased from the relation expression of driving current Ield. This means that, in the electroluminescent display device according to the exemplary aspect of the present disclosure, driving current Ield does not vary even when the threshold voltage Vth of the driving transistor DT varies. That is, in the exemplary aspect of the present disclosure, the data voltage cannot be programmed during the sampling period, irrespective of a variation in the threshold voltage Vth of the driving transistor DT.

As shown in Expression 1, the high-level supply voltage (VDD) component is erased from the relation expression of driving current Ield. Accordingly, in accordance with the exemplary aspect of the present disclosure, luminance adjustment may be achieved based on the reference voltage Vref and the data voltage Vdata without being influenced by VDD IR drop.

In addition, since the pixel circuit according to the exemplary aspect of the present disclosure can receive the high-level supply voltage VDD from the power supply while receiving the high high-level supply voltage VDD from the reference voltage/high-level supply voltage output unit of the gate driving circuit 13, the high-level supply voltage (VDD) line may be formed to have a mesh structure. Furthermore, even when the line supplying the high-level supply voltage VDD from the power supply is opened, the pixel circuit may receive the high-level supply voltage VDD from the reference voltage/high-level supply voltage output unit 22 of the gate driving circuit 13. Accordingly, opening of the high-level supply voltage line may be repaired.

As apparent from the above description, the gate driving circuit according to the present disclosure and the electroluminescent display device using the same have the following effects.

The pixel circuit can receive, at the first node, the high-level supply voltage VDD from the power supply while receiving, at the fifth node, the high high-level supply voltage VDD from the reference voltage/high-level supply voltage output unit of the gate driving circuit and, as such, the high-level supply voltage (VDD) line may be formed to have a mesh structure. In addition, even when the line supplying the high-level supply voltage VDD from the power supply is opened, opening of the high-level supply voltage line may be repaired.

Driving current flowing through the electroluminescent diode is not influenced by a high-level supply voltage component and, as such, luminance adjustment may be achieved based on the reference voltage Vref and the data voltage Vdata without being influenced by VDD IR drop.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. An organic light emitting display device comprising:

a display panel including a plurality of pixels, a first scan line, an emission control line, a data line, a high-level voltage supply line, a low-level voltage supply line and a reference voltage supply line, at least one transistor, and an organic light emitting diode containing organic compound layers between an anode and a cathode, each pixel of the plurality of pixels connected with the first scan line, the emission control line, the data line, the high-level voltage supply line, the low-level voltage supply line and the reference voltage supply line;

a data driving circuit connected to the data line;

a gate driving circuit connected to the first scan line and the emission control line;

a power supply unit connected to the high-level voltage supply line and the low-level voltage supply line, wherein the reference voltage supply line and the high-level voltage supply line are arranged in a mesh shape.

2. The organic light emitting display device of claim 1, wherein the at least one transistor comprises a switching transistor, and wherein the reference voltage supply line supplies a reference voltage to a first electrode of the switching transistor comprised in each of the plurality of pixels.

3. The organic light emitting display device of claim 1, wherein the gate driving circuit comprises a scan unit applying a scan signal to the first scan line and an emission control signal unit applying an emission control signal to the emission control line.

4. The organic light emitting display device of claim 1, wherein the gate driving circuit is disposed in a non-display area of the display panel.

5. The organic light emitting display device of claim 1, wherein the display panel further comprises touch sensors on the plurality of pixels.

6. The organic light emitting display device of claim 5, wherein the touch sensors are embodied using in-cell type touch sensors mounted in a pixel array.

7. The organic light emitting display device of claim 5, wherein the touch sensors are an on-cell type in which the touch sensors are disposed on a screen of the display panel.

8. The organic light emitting display device of claim 5, wherein the touch sensors are an add-on type in which the touch sensors are disposed on a screen of the display panel.

9. The organic light emitting display device of claim 1, wherein the at least one transistor includes a low-temperature polycrystalline silicon transistor.

10. The organic light emitting display device of claim 1, wherein, the gate driving circuit supplies a reference voltage or a high-level voltage to the each pixel through the reference voltage supply line depending on voltages at a set node and a reset node.

11. The organic light emitting display device of claim 10, wherein the gate driving circuit supplies the reference voltage to the each pixel during an initialization period and a sampling period of one frame period.

12. The organic light emitting display device of claim 1, wherein the gate driving circuit supplies the high-level voltage to the reference voltage supply line during a holding period and an emission period of one frame period.

13. The organic light emitting display device of claim 1, wherein the reference voltage supply line repairs the high-level voltage supply line.

14. The organic light emitting display device of claim 1, wherein the each pixel is further connected with a second scan line.

15. The organic light emitting display device of claim 14, wherein the each pixel is further connected with an initialization voltage supply line.

16. The organic light emitting display device of claim 15, wherein the each pixel comprises:

the organic light emitting diode connected between a fourth node and the low-level voltage supply line;

a driving transistor connected between a first node and a third node, the driving transistor including a gate electrode connected to a second node;

a first transistor connected between the third node and the second node, the first transistor including a gate electrode connected to the first scan line;

a second transistor connected between the data line and the first node, the second transistor including a gate electrode connected to the first scan line;

a third transistor connected between the high-level voltage supply line and the first node, the third transistor including a gate electrode connected to the emission control line;

a fourth transistor connected between the third node and the fourth node, the fourth transistor including a gate electrode connected to the emission control line;

a fifth transistor connected between the second node and the initialization voltage supply line, the fifth transistor including a gate electrode connected to the second scan line;

a sixth transistor connected between the fourth node and the initialization voltage supply line, the sixth transistor including a gate electrode connected to the first scan line;

a seventh transistor connected between the high-level voltage supply line and a fifth node which corresponds to the reference voltage supply line, the seventh transistor including a gate electrode connected to the emission control line; and a storage capacitor connected between the fifth node and the second node.

17. The organic light emitting display device of claim 1, wherein the organic compound layers include a hole injection layer, a hole transport layer, an emission layer, an electron transport layer, and an electron injection layer.

18. The organic light emitting display device of claim 1, wherein the gate driving circuit includes an oxide semiconductor transistor.

* * * * *